United States Patent
Wald et al.

(10) Patent No.: US 8,259,105 B2
(45) Date of Patent: Sep. 4, 2012

(54) RAY TRACING A THREE-DIMENSIONAL SCENE USING A HIERARCHICAL DATA STRUCTURE

(75) Inventors: Ingo Wald, Salt Lake City, UT (US); Solomon Boulos, Salt Lake City, UT (US); Peter Shirley, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 12/374,392

(22) PCT Filed: Jul. 16, 2007

(86) PCT No.: PCT/US2007/073635
§ 371 (c)(1),
(2), (4) Date: Nov. 24, 2009

(87) PCT Pub. No.: WO2008/011391
PCT Pub. Date: Jan. 24, 2008

(65) Prior Publication Data
US 2010/0060634 A1    Mar. 11, 2010

Related U.S. Application Data

(60) Provisional application No. 60/820,090, filed on Jul. 21, 2006.

(51) Int. Cl.
*G06T 17/00* (2006.01)

(52) U.S. Cl. ........ 345/420; 345/419; 345/421; 345/423; 345/424; 345/426; 345/581; 345/619

(58) Field of Classification Search .................. 345/419, 345/420, 421, 422, 423, 424, 426, 427, 581, 345/586, 619, 423.426; 715/201, 233, 246, 715/716
See application file for complete search history.

(56) References Cited

U.S. PATENT DOCUMENTS

| | | | |
|---|---|---|---|
| 6,556,200 B1 | 4/2003 | Pfister | |
| 7,289,118 B2 | 10/2007 | Schmittler | |
| 7,495,664 B2 * | 2/2009 | Keller et al. | 345/426 |
| 7,554,540 B2 * | 6/2009 | Hayes | 345/421 |
| 2004/0125103 A1 | 7/2004 | Kaufman | |

(Continued)

FOREIGN PATENT DOCUMENTS

WO    WO2008067483    6/2008

(Continued)

OTHER PUBLICATIONS

Reshetov et al. "Multi-Level Ray Tracing Algorithm", ACM 2005.*

(Continued)

*Primary Examiner* — Kimbinh T Nguyen
(74) *Attorney, Agent, or Firm* — Workman Nydegger

(57) ABSTRACT

Ray tracing a three-dimensional scene made up of geometric primitives that are spatially partitioned into a hierarchical data structure. One example embodiment is a method for ray tracing a three-dimensional scene made up of geometric primitives that are spatially partitioned into a hierarchical data structure. In this example embodiment, the hierarchical data structure includes at least a parent node and a corresponding plurality of child nodes. The method includes a first act of determining that a first active ray in the packet hits the parent node and a second act of descending to each of the plurality of child nodes.

16 Claims, 8 Drawing Sheets

U.S. PATENT DOCUMENTS

| | | | |
|---|---|---|---|
| 2006/0106815 A1 | 5/2006 | Timcenko | |
| 2007/0105008 A1 | 6/2007 | Kaufman et al. | |
| 2007/0182732 A1* | 8/2007 | Woop et al. | 345/420 |
| 2008/0043018 A1* | 2/2008 | Keller et al. | 345/426 |
| 2009/0167763 A1* | 7/2009 | Waechter et al. | 345/426 |
| 2009/0189898 A1* | 7/2009 | Dammertz et al. | 345/426 |
| 2009/0213115 A1* | 8/2009 | Keller et al. | 345/419 |
| 2009/0256845 A1* | 10/2009 | Sevastianov et al. | 345/426 |
| 2010/0053162 A1* | 3/2010 | Dammertz et al. | 345/426 |
| 2010/0073400 A1 | 3/2010 | Wald | |
| 2010/0194751 A1 | 8/2010 | Wald | |

FOREIGN PATENT DOCUMENTS

| | | |
|---|---|---|
| WO | WO2008067490 | 6/2008 |

OTHER PUBLICATIONS

Mahovsky "Memory-Conserving Bounding vol. Hierarchies with Coherent Ray Tracing", IEEE Jun. 22, 2006.*

Mahovsky "Ray Tracing with Reduced-Precision Bounding vol. Hierarchies". Submitted Jan. 2005.*

Mahovsky et al. "Memory-Conserving Bounding vol. Hierarchies with Coherent Ray Tracing". Submitted May 2005.*

International Search Report from PCT/US2007/073635 dated Aug. 5, 2008.

Written Opinion from PCT/US2007/073635 dated Jun. 11, 2008.

International Preliminary Report on Patentability PCT/US2007/073635 dated Jan. 27, 2009.

International Search Report from PCT/US2007/085965, dated Apr. 17, 2008, 1 page.

Wald et al., Ray Tracing Animated Scenes Using Cohert Grid Traversal, in ACM SIGGRAPH '06 Papers (Boston, Massachusetts, Jul. 30-Aug. 3, 2006) SIGGRAPH '06, ACM, New York, NY, pp. 485-493.

Ize, T. et al., "An Evaluation of Paralleled Grid Construction for Ray Tracing Dynamic Scenes," Interactive Ray Tracing 2006, IEEE Symposium on Sep. 2006, pp. 47-55.

International Search Report from PCT/US2007/085973, dated Jun. 2, 2008, 3 pages.

U.S. Appl. No. 12/515,812, mailed May 25, 2012, Office Action.

* cited by examiner

RAY TRACING A THREE-DIMENSIONAL SCENE USING A HIERARCHICAL DATA STRUCTURE

CROSS-REFERENCE TO RELATED APPLICATIONS

The present application claims priority from U.S. Provisional Patent Application Ser. No. 60/820,090, filed Jul. 21, 2006 and entitled "Ray Tracing Deformable Scenes Using Dynamic Bounding Volume Hierarchies" which is incorporated herein by reference in its entirety.

This invention was made with government support under Grant #CCR0306151 awarded by the National Science Foundation and Award #W-7405-ENG-48 awarded by the Department of Energy. The Government has certain rights to this invention."

BACKGROUND

In computer graphics, various methods have been developed for rendering a three-dimensional scene. One rendering method is ray tracing. Ray tracing is a global illumination rendering method that is able to render advanced visual effects such as reflection, refraction, and shadows. Ray tracing works by modeling and tracing the paths of individual rays of light as those rays make contact with three-dimensional objects within a scene. Ray tracing is thus capable of rendering a more realistic view of a scene than other rendering methods which are incapable of modeling reflection, refraction, and shadows.

In ray tracing, the objects in a three-dimensional scene are generally modeled as geometric primitives. A geometric primitive can either be a point, a line, a two-dimensional shape, or a three-dimensional shape. For example, one commonly used geometric primitive is a triangle, and the objects in a three-dimensional scene can be modeled as thousands or millions of triangles. Given a three-dimensional scene modeled as thousands or millions of geometric primitives, the main objective of ray tracing is to determine how a given number or rays intersect with the geometric primitives in the scene. Because of the high number of geometric primitive in even relatively basic three-dimensional scenes, simply checking each ray against each geometric primitive is very inefficient. Often ray tracing methods reduce the number of these intersection checks by using a hierarchical data structure.

Hierarchical data structures enable ray tracing methods to perform a relatively low-cost check to determine if a ray is in the general vicinity of a geometric primitive before having to perform a relatively high-cost check to determine if the ray intersects with the geometric primitive. In the event that the relatively low-cost check determines that the ray is not in the general vicinity of the geometric primitive, the relatively high-cost check can be avoided altogether, thus resulting in a lower overall cost of ray tracing a scene.

For example, a three-dimensional scene can be spatially partitioned into a hierarchical data structure having parent nodes and child nodes. Such a structure can be hierarchical in the sense that each child node is spatially bounded within its parent. Each parent can have one or more child nodes, and each geometric primitive can correspond to exactly one child node, although each child node may bound multiple geometric primitives.

Using this example hierarchical data structure, where a child node includes two geometric primitives, a ray tracing method can first perform a relatively low-cost check for an intersection between a ray and the child node. Where the ray does not intersect the child node, the ray tracing method can avoid a relatively high-cost check for an intersection between the ray and the two geometric primitives bounded by the node, since it is known that where the ray does not intersect with a node the ray will also not intersect with any child nodes or geometric primitives bounded within the node. In this way, the numbers of intersection checks can be lowered.

Unfortunately, however, even using the a hierarchical data structure, such as the example hierarchical data structure disclosed above, a typical ray tracing method may nevertheless remain very costly in terms of time and processing resources, due in part to a large number of rays that must be traced through a three-dimensional scene. For example, if the final desired pixel resolution for a three-dimensional scene is 800×600, some ray tracing methods would initially assign one ray to each pixel, resulting in 480,000 rays that must be traced through the scene. The number of node and geometric intersection tests required to ray trace each of the 480,000 rays to successfully render the scene can make rendering the scene using ray tracing very costly in terms of time and processing resources compared to other rendering methods such as Z-buffering. The time it takes to ray trace a scene can be excessively slow to make ray tracing a viable alternative to other rendering methods, such as Z-buffering, especially for applications that make use of dynamically changing scenes, such as simulation and game applications.

SUMMARY OF SOME EXAMPLE EMBODIMENTS

In general, example embodiments of the invention relate to ray tracing and, in particular, to methods for ray tracing a three-dimensional scene made up of geometric primitives that are spatially partitioned into a hierarchical data structure. The example methods disclosed herein enable a three-dimensional scene to be ray traced quickly and efficiently.

One example embodiment is a method for ray tracing a three-dimensional scene made up of geometric primitives that are spatially partitioned into a hierarchical data structure. In this example embodiment, the hierarchical data structure includes at least a parent node and a corresponding plurality of child nodes. The method includes a first act of determining that a first active ray in the packet hits the parent node and a second act of descending to each of the plurality of child nodes.

Another example method for ray tracing a three-dimensional scene using a similar hierarchical data structure includes a first act of determining that a group of rays comprising all active rays in the packet conservatively misses the parent node, and a second act of discarding each of the plurality of child nodes.

Yet another example method for ray tracing a three-dimensional scene using a similar hierarchical data structure includes a first act of determining that a first active ray in the packet does not hit the parent node, and a second act of testing a group of rays comprising all active rays in the packet to determine if the group conservatively misses the parent node.

A final example method for ray tracing a three-dimensional scene using a similar hierarchical data structure includes a first act of determining that a group of rays comprising all active rays in the packet does not conservatively miss the parent node, and a second act of testing a first active ray in the packet to determine if the first active ray hits the parent node.

These and other aspects of example embodiments of the present invention will become more fully apparent from the following description and appended claims.

BRIEF DESCRIPTION OF THE DRAWINGS

To further clarify the above and other aspects of example embodiments of the present invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention nor are they necessarily drawn to scale. Example embodiments of the invention will be disclosed and explained with additional specificity and detail through the use of the accompanying drawings in which.

DETAILED DESCRIPTION OF SOME EXAMPLE EMBODIMENTS

Figure 1:
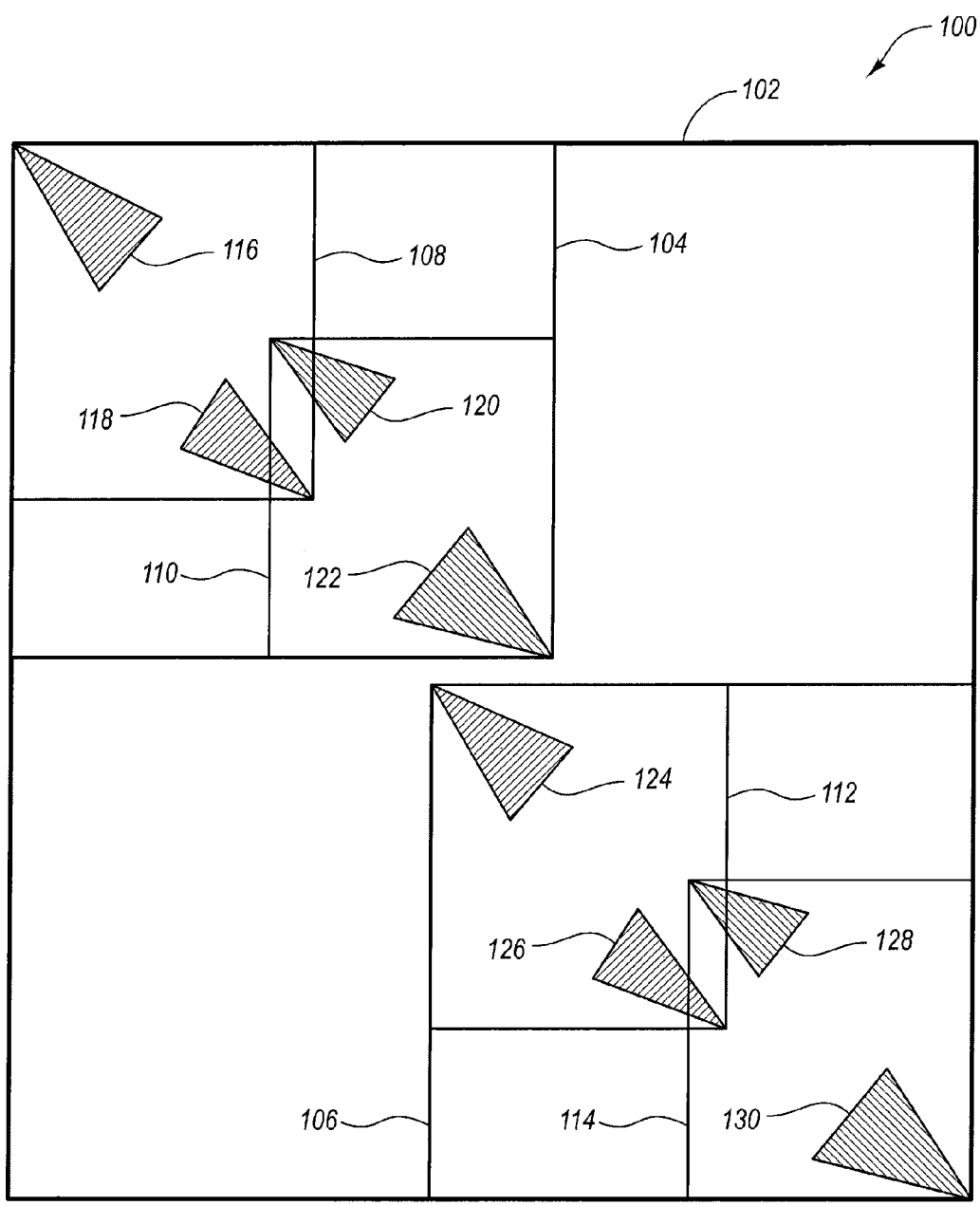
FIG. 1 is a schematic illustration of a three-dimensional scene that is spatially divided using bounding volumes.

As noted above, example embodiments of the invention relate to ray tracing and, in particular, to methods for ray tracing a three-dimensional scene made up of geometric primitives that are spatially partitioned into a hierarchical data structure. The example methods disclosed herein enable a three-dimensional scene to be ray traced quickly and efficiently.

As used herein, the term "hierarchical data structure" is defined as a data structure that includes at least a parent node with one or more corresponding child nodes. Each node in the hierarchical data structure defines a volume of three-dimensional space. The volume of three-dimensional space defined by each node can have any three-dimensional shape including, but not limited to a, cube, cuboid, sphere, pyramid, cone, tetrahedron, cylinder, octahedron, rhomboid, dodecahedron, pentagonal prism, pentagonal pyramid, or any other standard or custom three-dimensional shape. Each node in a hierarchical data structure is bounded within the node's parent, and each of the node's children is bounded within the node. In one example embodiment, sibling nodes may overlap, while in another example embodiment, sibling nodes may not overlap.

Where a first node is described herein as being "bounded within" a second node, it should be understood that this terminology refers to the volume defined by the first node being spatially bounded within the volume defined by the second node. Similarly, where a first node is described herein as "overlapping" a second node, it should be understood that this terminology refers to the volume defined by the first node spatially overlapping the volume defined by the second node. Also, where a ray is described herein as "hitting" a node, it should be understood that this terminology refers to the ray intersecting with the volume defined by the node. Conversely, where a ray is described herein as "missing" a node, it should be understood that this terminology refers to the ray not intersecting with the volume defined by the node.

In one example embodiment of a hierarchical data structure, a scene made up of geometric primitives is spatially partitioned into two types of nodes: regular nodes and leaf nodes. A leaf node includes one or more geometric primitives bounded within the leaf node. A regular node does not bound any geometric primitives within the regular node that are not also bounded within a child node of the regular node. In this example embodiment, a leaf node can be a child node, but can not be a parent node.

The structure of a hierarchical data structures can be useful in methods for ray tracing. For example, when it is determined that a ray hits a node, it is guaranteed that the ray also hits all ancestors of the node. Also, when it is determined that a ray misses a node, it is guaranteed that the ray also misses all descendants of the node, including all geometric primitives bounded within those descendant nodes. Thus, the structure of a hierarchical data structure can reduce the overall hit tests that must be performed while ray tracing a three-dimensional scene.

Some example hierarchical data structures that can be suitable for use with the example ray tracing methods disclosed herein include, but are not limited to, k-dimensional trees (KD trees), and bounding volume hierarchies (BVHs). The example ray tracing methods disclosed herein can also be implemented in connection with other hierarchical data structures.

Example embodiments of the present invention may comprise a special purpose or general-purpose computer including computer hardware, as discussed in greater detail below. Example embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable-type) computer-readable storage media, such as, RAM, ROM, EEPROM, CD-ROM or other optical disk storage, magnetic disk storage or other magnetic storage devices, or any other physical medium which can be used to store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Example embodiments of the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. Example embodiments of the invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In one example embodiment, methodological acts can be implemented in a ray tracing application. The ray tracing application can be a software application and/or a hardware application. The ray tracing application can include computer executable instructions that perform each of the example acts disclosed herein.

1. Example Hierarchical Data Structure

FIG. 1 illustrates an example three-dimensional scene 100 that is spatially divided into example bounding volumes 102-114. Although the example bounding volumes 102-114 are schematically illustrated as two-dimensional rectangular shapes in FIG. 1, it is noted that the bounding volumes 102-114 are actually three-dimensional axis aligned bounding boxes (AABBs).

As schematically illustrated in FIG. 1, the scene 100 is bounded by a bounding volume 102. The bounding volume 102 bounds bounding volumes 104 and 106. The bounding volume 104 bounds bounding volumes 108 and 110. The bounding volume 106 bounds bounding volumes 112 and 114. As illustrated is FIG. 1, the bounding volumes 108-114 each bound two geometric primitives 116 and 118, 120 and 122, 124 and 126, and 128 and 130, respectively. Although each of the bounding volumes 108-114 is illustrated as bounding exactly two geometric primitives, each of the bounding volumes 108-114 can alternatively include only one geometric primitive or three or more geometric primitives.

Figure 2:
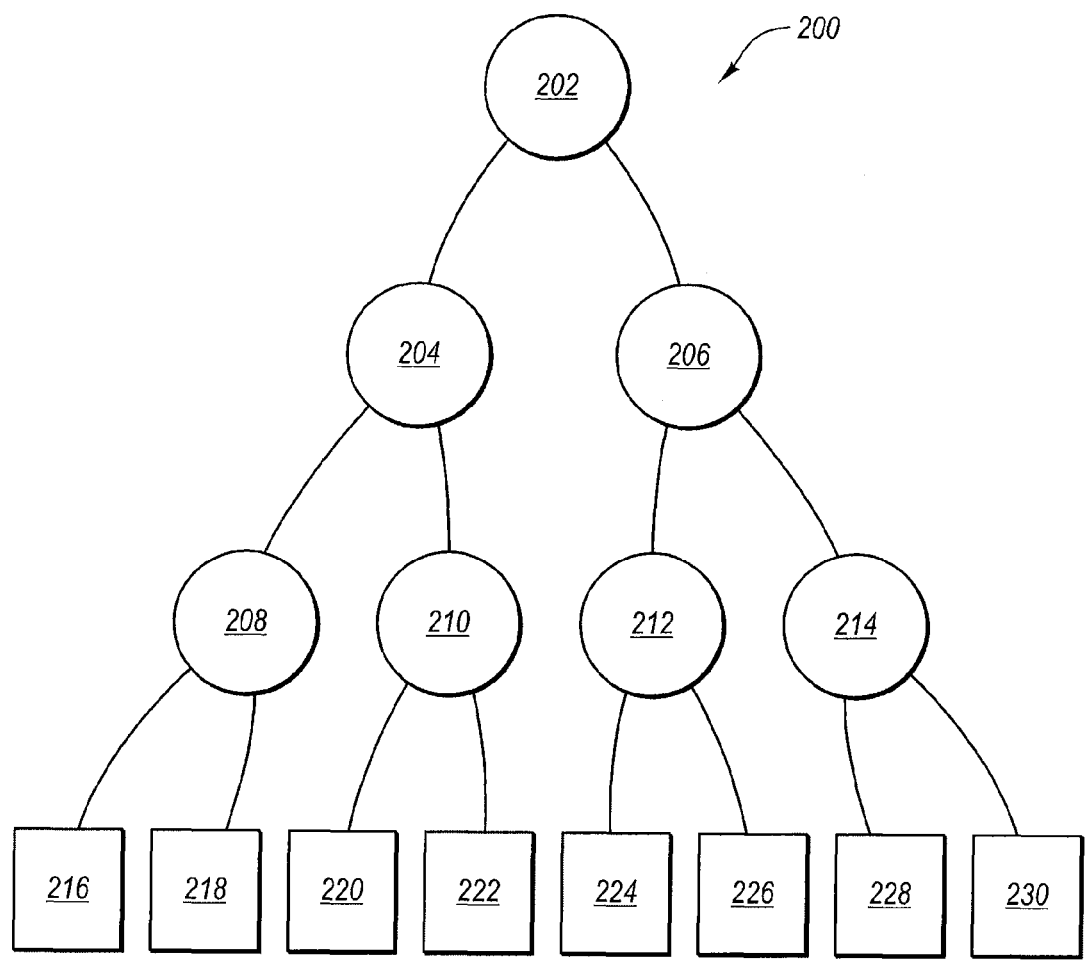
FIG. 2 is a schematic illustration of the bounding volume hierarchy of the bounding volumes illustrated in FIG. 1.

With reference now to FIG. 2, an example bounding volume hierarchy (BVH) 200 is illustrated. Although the example BVH 200 is configured as a binary BVH with each parent node having exactly two child nodes. The BVH 200 can alternatively be configured as a non-binary BVH, with each parent node including one child or three or more child nodes.

The example BVH 200 includes example nodes 202-214 and example geometric primitives 216-230. The example nodes 202-214 illustrated in FIG. 2 define the bounding volumes 102-114, respectively, illustrated in FIG. 1. Similarly, the primitive objects 216-230 illustrated in FIG. 2 define the geometric primitives 116-130, respectively, illustrated in FIG. 1.

As illustrated in FIG. 2, each of the nodes 202-214 in the example BVH 200 is hierarchically arranged. Specifically, each of the nodes 202-214 is a parent node and/or a child node. For example, the node 202 is a parent node to nodes 204 and 206. Similarly, node 204 is a child node to node 202 and a parent node to nodes 208 and 210. As illustrated in FIG. 2, each of the nodes 208-214 is a leaf node that bounds one or more geometric primitives.

2. Example Packet of Rays

As discussed above, a three-dimensional scene made up of geometric primitives can be spatially partitioned into a hierarchical data structure. The hierarchical data structure can then be used to decrease the number of ray intersection tests that are necessary in order to render the scene using a ray tracing rendering method. Instead of considering each ray individually, however, the example methods disclosed herein consider packets of rays. For example, a packet may include 4 rays, 16 rays, 256 rays, or more. In some example applications, the rays in the packet can correspond to a block of pixels that a ray tracing method is in the process of rendering. Specifically, a packet containing 4 rays can correspond to a 2×2 block of pixels, a packet containing 16 rays can correspond to a 4×4 block of pixels, and a packet containing 256 rays can correspond to a 16×16 block of pixels.

Figure 3A:
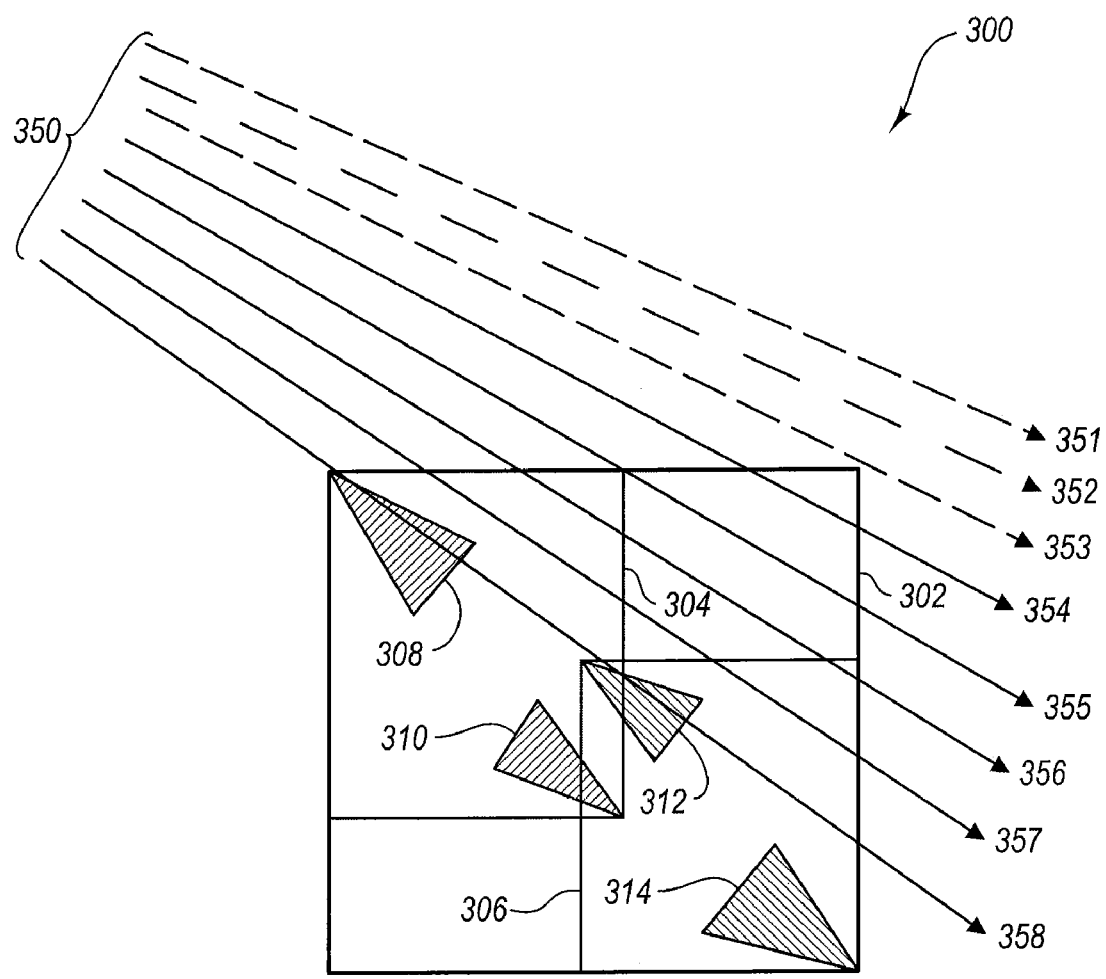
FIGS. 3A-3C are schematic illustrations of another example three-dimensional scene that is spatially divided using bounding volumes and an example packet of rays.
Figure 3B:
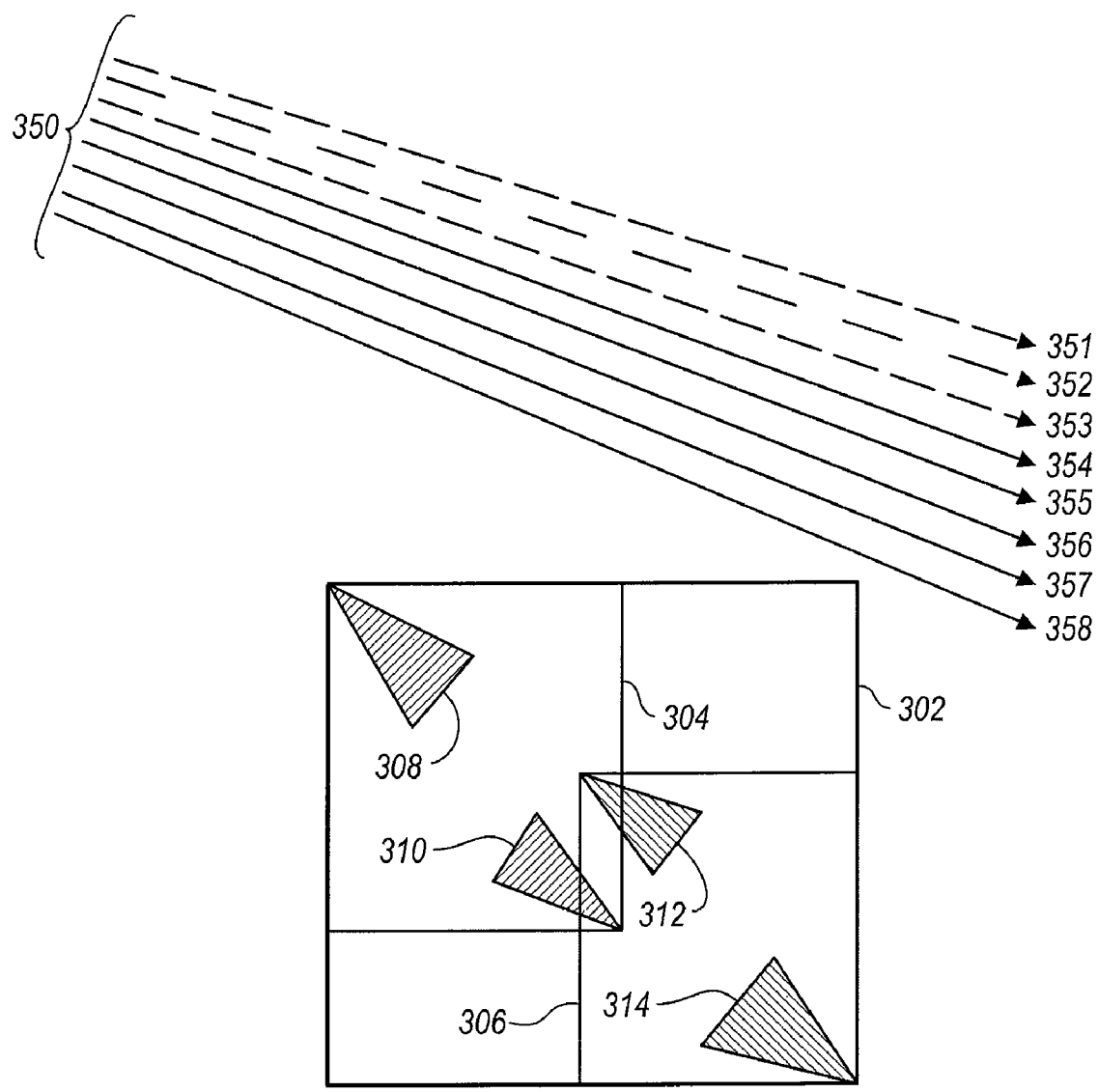
Figure 3C:
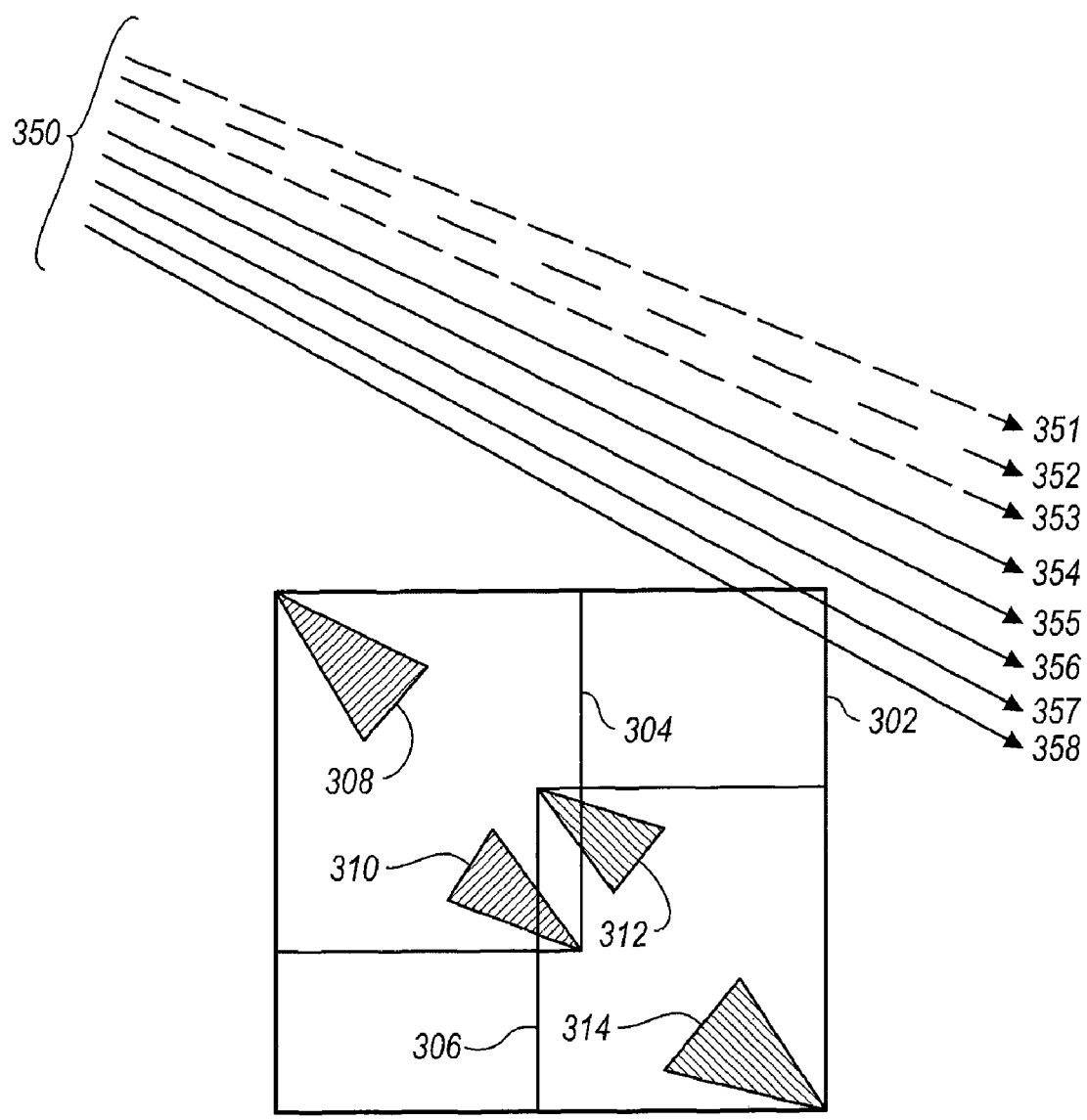

FIGS. 3A-3C illustrate an example three-dimensional scene 300. The example scene 300 includes a bounding volume 302 that bounds bounding volumes 304 and 306. The bounding volume 304 bounds geometric primitives 308 and 310. The bounding volume 306 bounds geometric primitives 312 and 314. FIGS. 3A-3C also illustrate a packet 350 of rays. The packet 350 of rays includes rays 351-358. The rays illustrated in FIGS. 3A-3C with dashed lines are inactive rays, and the rays illustrated with solid lines are active rays. For example, rays 351-353 are illustrated as inactive rays and rays 354-358 are illustrated as active rays in FIGS. 3A-3C. As used herein, the term "active ray" refers to a ray that is has not yet been eliminated in an intersection test on the current node or on an ancestor of the current node. As used herein, the term "inactive ray" or "deactivated ray" refers to a ray that is has been eliminated in an intersection test on the current node or on an ancestor of the current node. The tracking of active and inactive rays can avoid unnecessary intersection checks on rays that have already been eliminated in previous intersection checks.

In one example embodiment, the rays 351-358 in the packet 350 of rays can be ordered so that the rays are coherent. As illustrated in FIGS. 3A-3C, the rays 351-358 are ordered with ray 351 as the first ray and ray 358 as the last ray.

Figure 4:
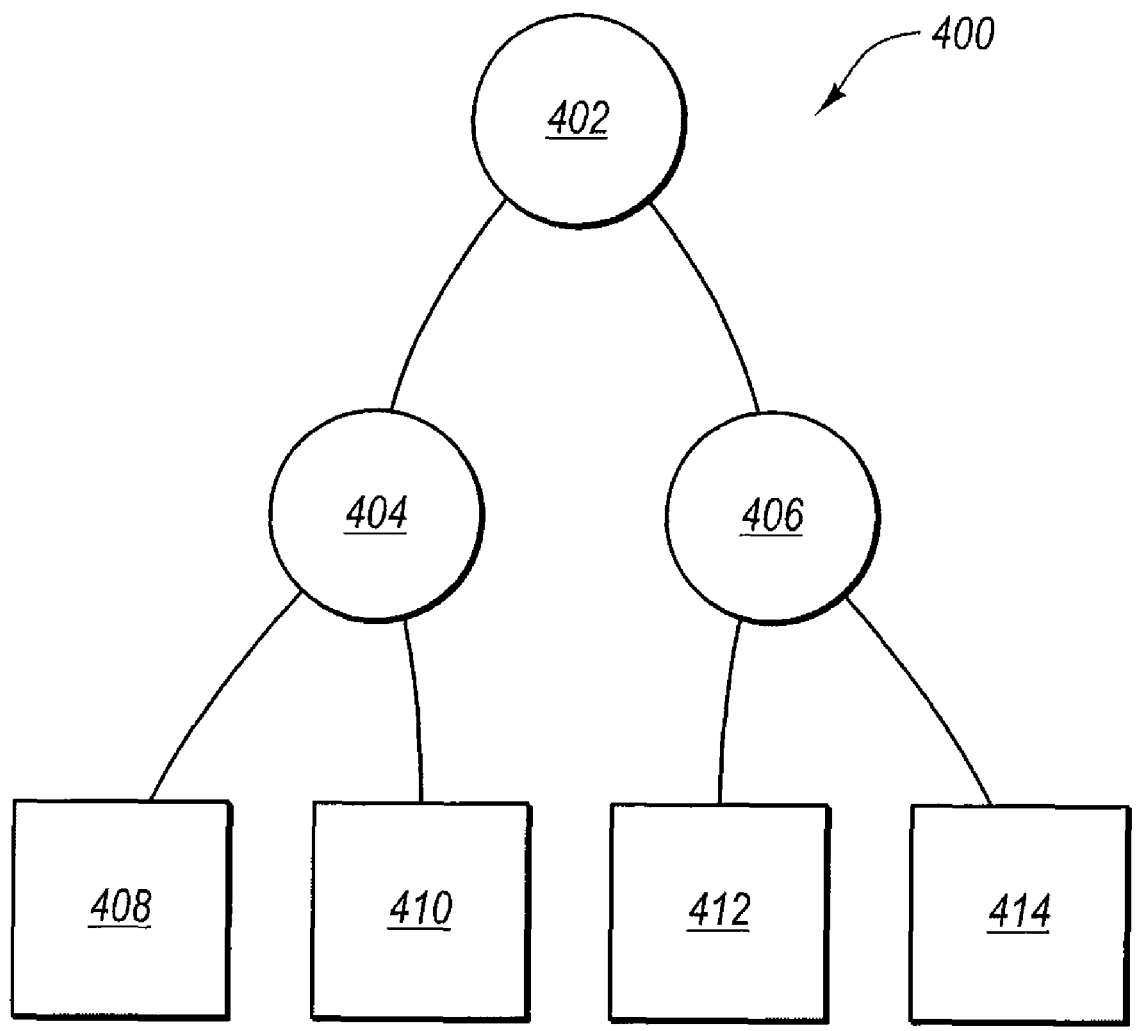
FIG. 4 is a schematic illustration of the bounding volume hierarchy of the bounding volumes illustrated in FIGS. 3A-3C.

FIG. 4 illustrates an example BVH 400. The example BVH 400 includes an example parent node 402, and two example child nodes 404 and 406. The example nodes 402-406 illustrated in FIG. 4 define the bounding volumes 302-306, respectively, illustrated in FIGS. 3A-3C. Similarly, the primitive objects 408-414 illustrated in FIG. 4 define the geometric primitives 308-314, respectively, illustrated in FIG. 1.

3. Example Method for Ray Tracing a Three-Dimensional Scene

Figure 5A:
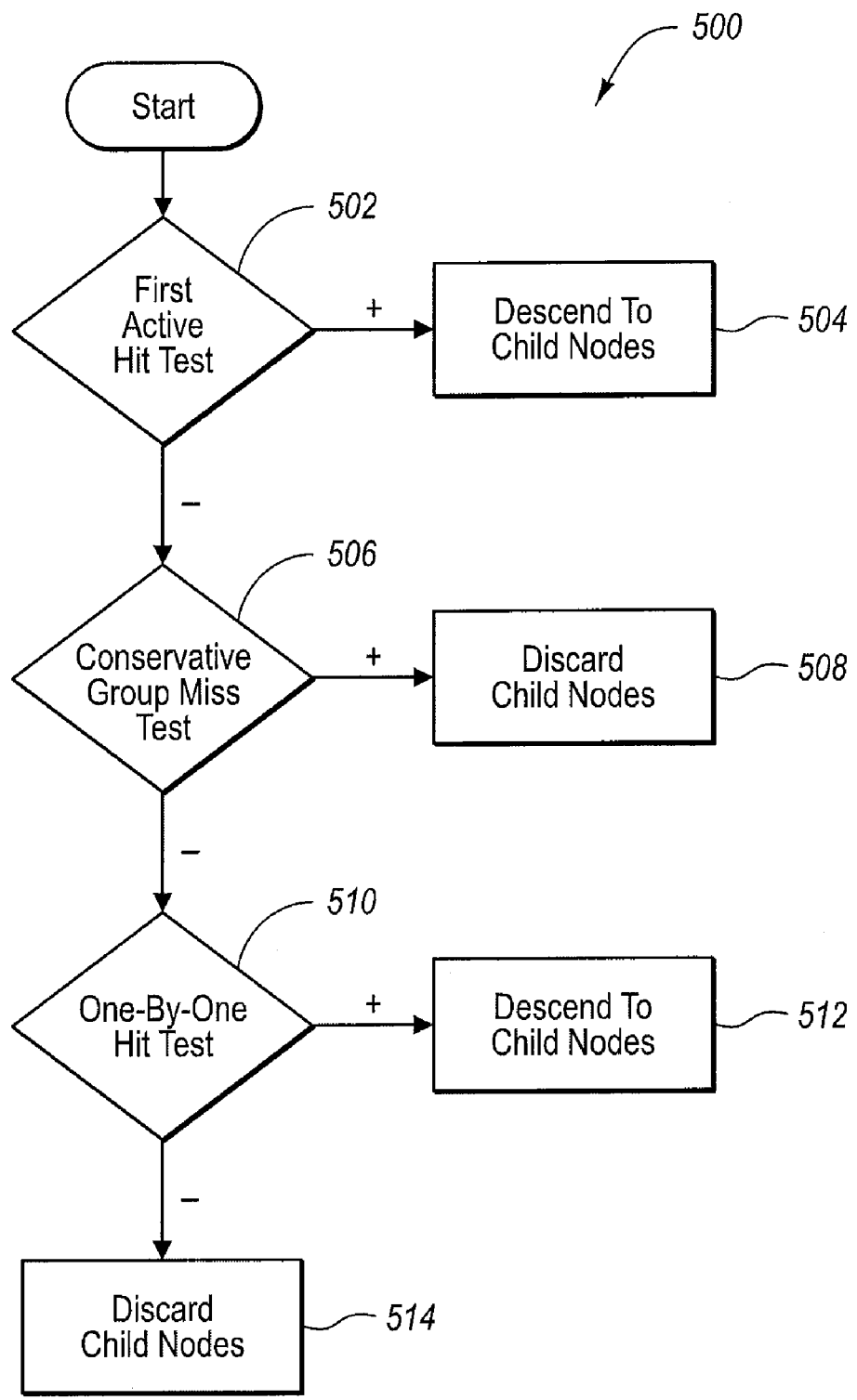
FIG. 5A is a flowchart that illustrates an example method for ray tracing a three-dimensional scene using a hierarchical data structure.

FIG. 5A illustrates an example method 500 for ray tracing a three-dimensional scene made up of geometric primitives that are spatially partitioned into a hierarchical data structure. As discussed above, a hierarchical data structure includes at least a parent node and a corresponding plurality of child nodes. The method 500 will be described with respect to the packet 350 of rays, the parent node 302, and the child nodes 404 and 406 of FIGS. 3A-3C and the BVH 400 of FIG. 4.

In operation, prior to the execution of the method 500, a three-dimensional scene made up of geometric primitives, such as the scene 100 of FIG. 1 or the scene 300 of FIGS. 3A-3C, is spatially partitioned into a hierarchical data structure, such as the BVH 200 of FIG. 2 or the BVH 400 of FIG. 4. During the execution of the method 500, each parent node in the hierarchical data structure is tested against a packet of rays to determine whether each of the child nodes of the parent node should be descended to, or whether each of the child nodes of the parent node should be discarded. For example, the parent node 402 illustrated in FIG. 4 can be tested against the packet 350 of rays during the execution of the method 500 to determine if each of the child nodes 404 and 406 should be descended to, or if each of the child nodes 404 and 406 should be discarded. As used herein, the phrase "descending to a child node" refers to testing for an intersection between one or more rays in a packet of rays and the volume defined by the child node. Similarly, as used herein, the phrase "discarding a child node" refers to not testing for an intersection between one or more rays in a packet of rays and the volume defined by the child node.

Method 500 includes an act 502 of testing a first active ray in the packet to determine if the first active ray hits the parent node. For example, as illustrated in FIG. 3A, a ray tracing application can test the first active ray 354 to determine if the first active ray 354 intersects the bounding volume 302 that is defined by the parent node 402.

If it is determined at the act 502 that the first active ray hits the parent node, the method 500 includes an act 504 of descending to each of the plurality of child nodes. For example, as illustrated in FIG. 3A, the ray tracing application can determine that the first active ray 354 intersects the bounding volume 302 that is defined by the parent node 402. The ray tracing application can therefore descend to the child nodes 404 and 406.

Conversely, if it is determined at the act 502 that the first active ray does not hit the parent node, the method 500 includes an act 506 of testing a group of rays comprising all active rays in the packet to determine if the group conservatively misses the parent node. For example, as illustrated in FIG. 3B, the ray tracing application can determine that the first active ray 354 does not intersect the bounding volume 302 that is defined by the parent node 402. Accordingly, the ray tracing application can test the group of active rays 354-358 in the packet 350 to determine if the group conservatively misses the parent node 402.

The term "conservative miss" as used herein refers to a determination where a positive result definitively indicates that all rays in a group of rays miss the parent node, but where a negative result provides no guarantee that any of the rays in the group of rays actually hit parent node. In one example embodiment, testing a group of rays to determine if the group "conservatively misses" the parent node can be less costly in terms of time and processing resources than testing a group of rays to determine if the group actually misses the parent node. Therefore, it is possible for the act 506 to yield a negative result although no ray actually hits a parent node. However, this possibility is infrequent enough in practice that the act 506 generally provides a net beneficial effect on the ray tracing method 500 when the act 506 is performed on multiple nodes.

In one example embodiment, the act 506 can be accomplished using interval arithmetic. For example, using interval arithmetic, the ray tracing application can compute an approximate (but conservative) packet-box overlap test to determine if the packet 350 of rays conservatively misses the parent node 402. This can be accomplished based on precomputed minima and maxima direction components of the packet 350.

In one example embodiment, the act 506 can further include deactivating the first active ray prior to testing a group of rays comprising all active rays in the packet to determine if the group conservatively misses the parent node. For example, as illustrated in FIG. 3B, since it was determined at act 502 that the first active ray 354 does not intersect the bounding box 302 defined by the parent node 402, the ray tracing application can deactivate the first active ray 354 prior to testing the updated group of active rays 355-358 in the packet 350 to determine if the group conservatively misses the parent node 402. In this example, the redundant testing of ray 354 can be avoided during act 506, and also potentially during act 510 (discussed below) should the method 500 proceed to act 510.

If it is determined at the act 506 that the group of rays comprising all active rays in the packet conservatively misses the parent node, the method 500 includes an act 508 of discarding each of the plurality of child nodes. For example, as illustrated in FIG. 3B, the ray tracing application can determine that the group of active rays 354-358 in the packet 350 conservatively does not intersect the bounding volume 302 defined by the parent node 402. The ray tracing application can therefore discard the child nodes 404 and 406.

Conversely, if it is determined at the act 506 that the group of rays comprising all active rays in the packet does not conservatively miss the parent node, the method 500 includes an act 510 of testing the active rays in the packet one-by-one to determine if one of the active rays hits the parent node. For example, as illustrated in FIG. 3C, the ray tracing application can determine that the group of active rays 354-358 in the packet 350 do not conservatively miss the bounding volume 302 defined by the parent node 402. Accordingly, the ray tracing application can test the active rays 354-358 in the packet 350 one-by-one to determine if one of the active rays 354-358 hits the bounding volume 302 defined by the parent node 402.

If it is determined at the act 510 that one of the active rays hits the parent node, the method 500 includes an act 512 of descending to each of the plurality of child nodes. For example, as illustrated in FIG. 3C, the ray tracing application can test ray 354, then ray 355, then ray 356, then ray 357 where it will determine that the active ray 357 hits the bounding volume 302 defined by the parent node 402. The ray tracing application can therefore descend to the child nodes 404 and 406.

In one example embodiment, the act 512 can further include deactivating each active ray that was tested at the act 510 and determined to not hit the parent node prior to descending to each of the plurality of child nodes. For example, as illustrated in FIG. 3C, since it was determined at the act 510 that the active rays 354-356 do not intersect the bounding volume 302 defined by the parent node 402, the ray tracing application can deactivated the active rays 354-356 prior to descending to the child nodes 404 and 406. In this example, the testing of rays 354-356 can be avoided during the testing of nodes 404 and 406 since the fact that these rays did not intersect with the bounding volume 302 makes testing these rays against the nodes 404 and 406 unnecessary.

Conversely, if it is determined at the act 510 that none of the active rays hit the parent node, the method 500 includes an act 514 discarding each of the plurality of child nodes. For example, as illustrated in FIG. 3B, the ray tracing application can determine, by testing each active ray one-by-one, that none of the active rays 354-358 hit the bounding volume 302 defined by the parent node 402. The ray tracing application can therefore discard the child nodes 404 and 406.

Figure 5B:
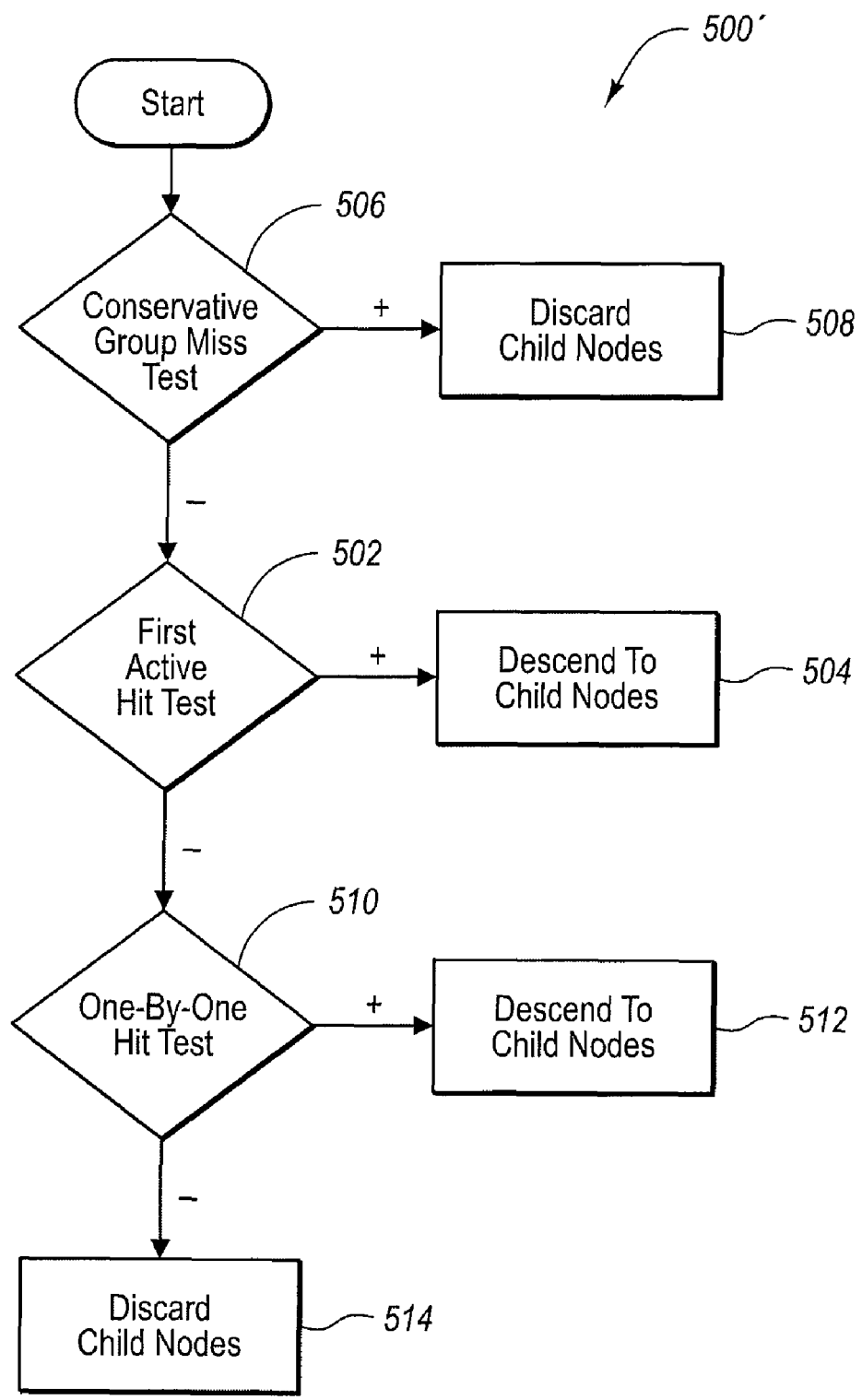
FIG. 5B is a flowchart that illustrates another example method for ray tracing a three-dimensional scene using a hierarchical data structure.

FIG. 5B illustrates another example method 500' for ray tracing a three-dimensional scene made up of geometric primitives that are spatially partitioned into a hierarchical data structure. The method 500' of FIG. 5B is identical to the method 500 of FIG. 5A, except the act 506 is positioned before the acts 502.

In one example embodiment of the methods 500 and 500', the methods 500 and 500' can be applied to a leaf node (with the act being performed on the leaf node as though the leaf node were a parent node) by performing an additional ray versus leaf-node test which deactivates all rays that do not hit the bounding volume defined by the leave node before descending to each geometric and performing intersections tests with the active rays in the packet and the geometric primitive.

Embodiments of the present invention can enable a three-dimensional scene to be ray traced quickly and efficiently. Specifically, embodiments of the present invention can contribute to an overall ray tracing method that is a viable alternative to other rendering methods such as Z-buffering, even for applications that make use of dynamically changing scenes, such as simulation and game applications. In particular, this overall ray tracing method can achieve performance for deformable scenes comparable to that previously available only for static scenes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, the computer system including a processor and system memory, the computer system also including a hierarchical data tree structure representing a plurality of geometric primitives within a three-dimensional scene, data in the hierarchal data tree structure partitioned in accordance with object partitioning, the hierarchically data tree structure including a root node, one or more levels of intermediate nodes, and, a plurality of leaf nodes, each intermediate node corresponding to a bounding volume within the three-dimensional scene, the plurality of leaf nodes representing the plurality of geometric primitives, bounding volumes of child intermediate nodes and geometric primitives of leaf nodes being bound within bounding volumes of their corresponding parent nodes, a method for ray tracing the three-dimensional scene by finding any intersections between light rays and the plurality geometric primitives, the method comprising:

an act of accessing the hierarchical data tree structure;

an act of accessing data representing a packet of a plurality of coherent light rays, a first active ray and one or more other active rays from the plurality of coherent light rays being a group of active rays;

for each descended to node in the one or more levels of intermediate nodes and leaf nodes and working down from the root node towards the leaf nodes within the hierarchical data tree structure, an act of testing the descended to node against the packet of the plurality of coherent light rays to identify intersections between light rays in the group of active rays and the plurality of geometric objects, including:

when the descended to node is an intermediate node:

an act of the processor testing the first active ray to determine if the first active ray hits the descended to node;

when the first active ray hits the descended to node, an act of descending to any child nodes of the descended to node;

when the first active ray does not hit the descended to node, an act of the processor testing the group of active rays to determine if the group of active rays conservatively misses the descended to node, the group of active rays conservatively missing the descended to node when an interval arithmetic analysis definitively indicates that all rays in the group of active rays actually miss the descended to node, the group of active rays not conservatively missing the descended to node when the interval arithmetic analysis provides no guarantee that at least one ray in the group of rays actually hits the descended to node;

when the group of active rays conservatively misses the descended to node, an act of discarding the child nodes of the descended to node;

when the group of active rays does not conservatively miss the descended to node, an act of the processor testing each of the one or more other active rays one-by-one to determine if any of the one or more other active rays hit the descended to node;

when at least one of the one or more other active rays hit the descended to node, an act of descending to the child nodes of the descended to node; and when at least one of the one or more other active rays does not hit the descended to node, an act of discarding the child nodes of the descended to node; and when the descended to node is a leaf node, an act of determining if any active ray intersects a geometric primitive that the leaf node represents.

2. The method as recited in claim 1, further comprising an act of deactivating the first active ray prior to testing the group of active rays to determine if the group of active rays conservatively misses the descended to parent node so as to avoid redundantly testing the first active ray.

3. The method as recited in claim 1, wherein the act of testing the group of active rays to determine if the group of active rays conservatively misses the descended to node comprises using the interval arithmetic analysis to perform a packet-box overlap test.

4. The method as recited in claim 1, wherein the hierarchal data tree structure comprises a bounding volume hierarchy ("BVH").

5. The method as recited in claim 4, wherein each bounding volume comprises an axis aligned bounding box ("AABB").

6. The method as recited in claim 1, wherein the first active ray and the one or more other active rays comprise rays in the plurality of coherent light rays that have not yet been eliminated as not hitting a descended to node or an ancestor of the descended to node in the hierarchical data tree structure.

7. The method as recited in claim 3, wherein using the interval arithmetic analysis to perform a packet-box overlap test comprises performing the packet-box overlap test based on pre-computed minima and maxima direction components of the packet.

8. The method as recited in claim 3, wherein using the interval arithmetic analysis to perform a packet-box overlap test comprises performing an approximate but conservative packet-box overlap test.

9. The method as recited in claim 1, further comprising:

an act of deactivating each active ray that is determined to not hit the descended to node during the act of testing each of the one or more other active rays one-by-one to determine if any of the one or more other active rays hit the descended to node.

10. At a computer system, the computer system including a processor and system memory, the computer system also including a hierarchical data tree structure representing a plurality of geometric primitives within a three-dimensional scene, data in the hierarchal data tree structure partitioned in accordance with object partitioning, the hierarchically data tree structure including a root node, one or more levels of intermediate nodes, and, a plurality of leaf nodes, each intermediate node corresponding to a bounding volume within the three-dimensional scene, the plurality of leaf nodes representing the plurality of geometric primitives, bounding volumes of child intermediate nodes and geometric primitives of leaf nodes being bound within bounding volumes of their corresponding parent nodes, a method for ray tracing the three-dimensional scene, the method comprising:

an act of accessing the hierarchical data tree structure;

an act of accessing data representing a packet of a plurality of coherent light rays, a first active ray and one or more other active rays from the plurality of coherent light rays being a group of active rays;

for each descended to node in the one or more levels of intermediate nodes and leaf nodes and working down from the root node towards the leaf nodes within the hierarchical data tree structure, an act of testing the descended to node against the packet of the plurality of coherent light rays to identify intersections between light rays in the group of active rays and the plurality of geometric objects, including:

when the descended to node is an intermediate node:

an act of the processor testing the group of active rays to determine if the group of active rays conservatively misses the descended to parent node, the group of active rays conservatively missing the descended to parent node when an interval arithmetic analysis definitively indicates that all rays in the group of active rays actually miss the descended to parent node, the group of active rays not conservatively missing the descended to parent node when the interval arithmetic analysis provides no guarantee that at least one ray in the group of rays actually hits the descended to parent node;

when the group of active rays conservatively misses the descended to parent node, an act of discarding any child nodes of the descended to parent node;

when the group of active rays does not conservatively miss the descended to parent node, an act of the processor testing the first active ray to determine if the first active ray hits the descended to parent node;

when the first active ray hits the descended to parent node, an act of descending to the child nodes of the descended to parent node;

when the first active ray does not hit the descended to parent node, an act of the processor testing each of the one or more other active rays one-by-one to determine if any of the one or more other active rays hit the descended to parent node;

when at least one of the one or more other active rays hit the descended to parent node, an act of descending to the child nodes of the descended to parent node; and when at least one of the one or more other active rays does not hit the descended to parent node, an act of discarding the child nodes of the descended to parent node; and when the descended to node is a leaf node, an act of determining if any active ray intersects a geometric primitive that the leaf node represents.

11. The method as recited in claim 10, further comprising: an act of deactivating the first active ray prior to testing the one or more other active rays.

12. The method as recited in claim 10, wherein the act of testing the group of active rays to determine if the group of active rays conservatively misses the descended to parent node comprises using the interval arithmetic to perform a packet-box overlap test.

13. The method as recited in claim 10, wherein the hierarchal data tree structure comprises a bounding volume hierarchy ("BVH").

14. The method as recited in claim 13, wherein each bounding volume is an axis aligned bounding box ("AABB").

15. A computer program product for use at a computer system, the computer system including a hierarchical data tree structure representing a plurality of geometric primitives within a three-dimensional scene, data in the hierarchal data tree structure partitioned in accordance with object partitioning, the hierarchically data tree structure including a root node, one or more levels of intermediate nodes, and, a plurality of leaf nodes, each intermediate node corresponding to a bounding volume within the three-dimensional scene, the plurality of leaf nodes representing the plurality of geometric primitives, bounding volumes of child intermediate nodes and geometric primitives of leaf nodes being bound within bounding volumes of their corresponding parent nodes, the computer program product for implementing a method for ray tracing the three-dimensional scene by finding any intersections between light rays and the plurality geometric primitives, the computer program product comprising one or more computer storage media having stored thereon computer-executable instructions that, when executed at a processor, cause the computer system to perform the method, including the following:

access the hierarchical data tree structure;

access data representing a packet of a plurality of coherent light rays, a first active ray and one or more other active rays from the plurality of coherent light rays being a group of active rays;

for each descended to node in the one or more levels of intermediate nodes and leaf nodes and working down from the root node towards the leaf nodes within the hierarchical data tree structure, test the descended to node against the packet of the plurality of coherent light rays to identify intersections between light rays in the group of active rays and the plurality of geometric objects, including:

when the descended to node is an intermediate node:

test the first active ray to determine if the first active ray hits the descended to node;

when the first active ray hits the descended to node, descend to any child nodes of the descended to node;

when the first active ray does not hit the descended to node, test the group of active rays to determine if the group of active rays conservatively misses the descended to node, the group of active rays conservatively missing the descended to node when an interval arithmetic analysis definitively indicates that all rays in the group of active rays actually miss the descended to node, the group of active rays not conservatively missing the descended to node when the interval arithmetic analysis provides no guarantee that at least one ray in the group of rays actually hits the descended to node;

when the group of active rays conservatively misses the descended to node, discard the child nodes of the descended to node;

when the group of active rays does not conservatively miss the descended to node, test each of the one or more other active rays one-by-one to determine if any of the one or more other active rays hit the descended to node;

when at least one of the one or more other active rays hit the descended to node, descend to the child nodes of the descended to node; and when at least one of the one or more other active rays does not hit the descended to node, discard the child nodes of the descended to node; and when the descended to node is a leaf node, determine if any active ray intersects a geometric primitive that the leaf node represents.

16. A computer program product for use at a computer system, the computer system including a hierarchical data tree structure representing a plurality of geometric primitives within a three-dimensional scene, data in the hierarchal data tree structure partitioned in accordance with object partitioning, the hierarchically data tree structure including a root node, one or more levels of intermediate nodes, and, a plurality of leaf nodes, each intermediate node corresponding to a bounding volume within the three-dimensional scene, the plurality of leaf nodes representing the plurality of geometric primitives, bounding volumes of child intermediate nodes and geometric primitives of leaf nodes being bound within bounding volumes of their corresponding parent nodes, the computer program product for implementing a method for ray tracing the three-dimensional scene by finding any intersections between lights rays and the plurality geometric primitives, the computer program product comprising one or more computer storage media having stored thereon computer-executable instructions that, when executed at a processor, cause the computer system to perform the method, including the following:

access the hierarchical data tree structure;

access data representing a packet of a plurality of coherent light rays, a first active ray and one or more other active rays from the plurality of coherent light rays being a group of active rays;

for each descended to node in the one or more levels of intermediate nodes and leaf nodes and working down from the root node towards the leaf nodes within the hierarchical data tree structure, test the descended to node against the packet of the plurality of coherent light rays to identify intersections between light rays in the group of active rays and the plurality of geometric objects, including:

when the descended to node is an intermediate node:

test the group of active rays to determine if the group of active rays conservatively misses the descended to parent node, the group of active rays conservatively missing the descended to parent node when an interval arithmetic analysis definitively indicates that all rays in the group of active rays actually miss the descended to parent node, the group of active rays not conservatively missing the descended to parent node when the interval arithmetic analysis provides no guarantee that at least one ray in the group of rays actually hits the descended to parent node;

when the group of active rays conservatively misses the descended to parent node, discard any child nodes of the descended to parent node;

when the group of active rays does not conservatively miss the descended to parent node, test the first active ray to determine if the first active ray hits the descended to parent node;

when the first active ray hits the descended to parent node, descend to the child nodes of the descended to parent node;

when the first active ray does not hit the descended to parent node, test each of the one or more other active rays one-by-one to determine if any of the one or more other active rays hit the descended to parent node;

when at least one of the one or more other active rays hit the descended to parent node, descend to the child nodes of the descended to parent node; and when at least one of the one or more other active rays does not hit the descended to parent node, discard the child nodes of the descended to parent node; and when the descended to node is a leaf node, determine if any active ray intersects a geometric primitive that the leaf node represents.

* * * * *